UNITED STATES PATENT OFFICE.

JOSEPH J. NUGENT, OF MERRILL, WISCONSIN, ASSIGNOR OF ONE-HALF TO EDWARD F. VAN HOOTEGEM, OF SAME PLACE.

COMPOSITION FOR BLACKBOARDS.

SPECIFICATION forming part of Letters Patent No. 625,894, dated May 30, 1899.

Application filed April 1, 1899. Serial No. 711,381. (No specimens.)

*To all whom it may concern:*

Be it known that I, JOSEPH J. NUGENT, a citizen of the United States, residing at Merrill, in the county of Lincoln and State of Wisconsin, have invented a certain new and useful Improvement in a Composition for Blackboards, of which the following is a specification.

My invention relates to improvements in a compound for blackboards; and it consists of the following ingredients in about the proportions given: lime slaked to a putty consistency, one hundred pounds; pecoria black stain, twenty-five pounds; ground quartz-silex No. 0000, twenty pounds; ground quartz-silex No. 400, thirteen pounds; ground quartz-silex, six pounds; plaster-of-paris, forty pounds; cement, eighteen pounds; glue, six ounces.

In compounding the ingredients I take lime and slake it to about a putty consistency as a basis, to which I add the three grades of ground quartz-silex and thoroughly mix them while the lime is still warm from the slaking process. When this mixture is cold, the pecoria black stain is added and thoroughly mixed. These ingredients can be mixed ready for use and, if desired, sealed up; but the plaster-of-paris, cement, and glue should not be added until it is desired to use the compound for making a blackboard.

When the operator is ready to produce the blackboard, the glue, plaster-of-paris, and cement are dissolved and mixed with water and added to the other ingredients. For instance, the plasterer will take about as much of the first mixture as he can handle—say twenty-five pounds. He then should add to four quarts of water one and one-half ounces of glue. The dissolved glue, with ten pounds of plaster-of-paris and four and one-half pounds of cement, is then added to the twenty-five pounds of the composition and thoroughly mixed. The compound is then complete and ready for use.

A blackboard composition composed of the above ingredients produces a superior blackboard-surface which can be applied to the wall like plastering, to a board, or to a wire-netting, as desired.

The composition is cheap to produce, as well as superior in quality.

Having thus described my invention, what I claim, and desire to secure by Letters Patent, is—

1. A compound for blackboards consisting of slaked lime, ground quartz, black stain, glue, cement and plaster-of-paris, substantially as described.

2. A compound for blackboards consisting of slaked lime, a plurality of grades of quartz-silex, black stain, glue, cement and plaster-of-paris substantially as described.

In testimony whereof I affix my signature in presence of two witnesses.

JOSEPH J. NUGENT.

Witnesses:
JOHN VAN HECKE,
E. E. WEISE.